United States Patent
Lee

(10) Patent No.: US 9,791,967 B2
(45) Date of Patent: *Oct. 17, 2017

(54) PROCESSING METHOD FOR IMPLEMENTING HIGH RESOLUTION OUTPUTS OF A CAPACITIVE TOUCH PAD ON A LOW-END SINGLE-CHIP MICROCOMPUTER

(71) Applicant: GEMSTAR TECHNOLOGY (CHINA) CO. LTD., Guangdong (CN)

(72) Inventor: Ivan Lee, Guangdong (CN)

(73) Assignee: Gemstar Technology (China) Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,307

(22) Filed: Jun. 17, 2016

(65) Prior Publication Data

US 2016/0370933 A1    Dec. 22, 2016

Related U.S. Application Data

(63) Continuation of application No. 14/369,779, filed as application No. PCT/CN2012/087711 on Dec. 27, 2012, now Pat. No. 9,436,333.

(30) Foreign Application Priority Data

Jan. 11, 2012 (CN) .......................... 2012 1 0006920

(51) Int. Cl.
*G06F 3/041*    (2006.01)
*G06F 3/044*    (2006.01)
*G06F 3/02*     (2006.01)

(52) U.S. Cl.
CPC .......... *G06F 3/0416* (2013.01); *G06F 3/0227* (2013.01); *G06F 3/044* (2013.01); *G06F 2203/04112* (2013.01)

(58) Field of Classification Search
None
See application file for complete search history.

(56) References Cited

U.S. PATENT DOCUMENTS 6,323,846 B1 * 11/2001 Westerman ........... G06F 3/0235
                                                345/173
2004/0054299 A1 *  3/2004 Burdorff ............ A61B 10/0275
                                                600/564

(Continued)

*Primary Examiner* — Kent Chang
*Assistant Examiner* — Nathan Brittingham
(74) *Attorney, Agent, or Firm* — Greenberg Traurig, LLP

(57) ABSTRACT

A processing method for implementing high resolution output of a capacitive touch pad on a low-end single-chip microcomputer. The low-end single-chip microcomputer device comprises a master control single-chip microcomputer unit (MCU), a self-checking capacitance sensing module and a capacitive touch pad. The master control single-chip microcomputer module controls the self-checking capacitance sensing module to obtain source data acquired by the self-checking capacitance sensing module from the capacitive touch pad, then the source data are subjected to touch position computing by the master control single-chip microcomputer to obtain an original coordinate data of a touch point, and then a coordinate position can be obtained through an optimizing computation processing.

7 Claims, 8 Drawing Sheets

(56) References Cited

U.S. PATENT DOCUMENTS

| | | | |
|---|---|---|---|
| 2008/0136792 A1* | 6/2008 | Peng | G06F 3/0416 345/174 |
| 2009/0254276 A1* | 10/2009 | Faulkner | G01C 21/16 701/469 |
| 2010/0073318 A1* | 3/2010 | Hu | G06F 3/044 345/174 |
| 2011/0119320 A1* | 5/2011 | Wu | G06F 3/023 708/235 |
| 2011/0285654 A1* | 11/2011 | Park | G06F 3/0418 345/173 |
| 2012/0268413 A1* | 10/2012 | Narasimhan | G06F 3/0418 345/174 |
| 2013/0176274 A1* | 7/2013 | Sobel | G06F 3/0416 345/174 |
| 2014/0368466 A1* | 12/2014 | Li | G06F 3/044 345/174 |

* cited by examiner

PROCESSING METHOD FOR IMPLEMENTING HIGH RESOLUTION OUTPUTS OF A CAPACITIVE TOUCH PAD ON A LOW-END SINGLE-CHIP MICROCOMPUTER

RELATED APPLICATION INFORMATION

This application claims the benefit of and is a continuation of U.S. Ser. No. 14/369,779, filed on Jun. 30, 2014, which application, in turn, claims the benefit of PCT/CN 2012/087711, filed on Dec. 27, 2012, and CN 201210006920.5, filed on Jan. 11, 2012, the disclosures of which are incorporated herein by reference in their entirety.

TECHNICAL FIELD OF THE INVENTION

The present invention relates to a data processing method of touch pads, and more particularly, to a processing method for implementing high resolution outputs of a capacitive touch pad on a low-end single-chip microcomputer equipment.

BACKGROUND

Operating principle of a capacitive touch pad is that: a capacitive sensing panel is a small area of electrode (the electrode plate can be in a shape of a rectangle, a triangle, a circle and the like) which is in connection with a capacitive sensing path of a capacitance sensing module via a wire, so that the small area of electrode can form a low-voltage electric field in an electric conductor; when touching or closing the capacitive panel, owing to the electrical field on human body, a coupling capacitance can be formed between fingers and a conductive layer so that a flow of current is implemented between the capacitive sensing panel (electrode) and the capacitive sensing path of the capacitance sensing module, and then the capacitance sensing module can convert to a corresponding value of sensing capacitance in accordance with the change of the current; the whole touch pad is formed of a plurality of small sensing panels arranged in a certain layout, and thus touch positions can be accurately calculated according to the value of capacitance of each small panel (each capacitive sensing path) and the layout thereof.

The touch pad and the sensing electrode can be made of PCB and circuit wiring. Generally, the wiring of the sensing electrode is disposed on the top layer with an additional non-conductive protective layer. In comparison with a common resistive touch pad, the capacitive touch pad becomes more and more popular and has been used more and more widely due to the reasons that it has a faster speed of response and is able to support various technologies, such as the multiple touch technology and the like.

To apply the capacitive touch pad to electronic equipment, a higher grade of single-chip microcomputer, such as a 16 bit or 32 bit single-chip microcomputer, needs to be used in a general design so that the capacitive touch pad can have a good performance and representation effect. These high-end single-chip microcomputers can be the chips of ARM series or MIPS series, and the like. However, these kinds of the chips of the single-chip microcomputers are very expensive and have relatively higher power consumption, which result in the increase of manufacture cost and the need of equipping with a compatible power supply module with high capability. Accordingly, the electronic equipments which are able to apply for the capacitive touch pads at present are only limited on the high-end application facilities manufactured by several large manufactures. Therefore, the capacitive touch pads are not suitable to be used in ultra-low power consumption (the current consumption is lower than the level of tens of microampere (uA), even lower than the level of a few microamperes) embedded equipments, such as a remote controller. With the diversified development of electronic equipments, it is desired to develop diversified application solutions suitable for more and more the low-end equipments. Therefore, there is a difficulty in combing an 8-bit single-chip microcomputer designed as master controller equipment with the capacitive touch pad.

SUMMARY

The present invention aims to provide a processing method for implementing high resolution outputs of a capacitive touch pad on a low-end single-chip microcomputer device. In this method, the electronic devices of the low-end single-chip microcomputer and the capacitive touch pad are incorporated to fully take advantages of calculation and processing capabilities of the low-end single-chip microcomputer so as to improve data processing efficiency, so that the high resolution outputs of the capacitive touch pad can be achieved on the low-end single-chip microcomputer.

The above-described object of the invention can be achieved by the following technical measures: a processing method for implementation of capacitive touch pad high resolution outputs on a low-end single chip microcomputer device, the low-end single-chip microcomputer device comprises a master control single-chip microcomputer module, a self-checking capacitance sensing module and a capacitive touch pad; the master control single-chip microcomputer module controls the self-checking capacitance sensing module to obtain source data acquired by the self-checking capacitance sensing module from the capacitive touch pad, then the source data are subjected to touch position computing by the master control single-chip microcomputer to obtain an original coordinate data of a touch point, and then a coordinate position can be obtained through an optimizing computation processing; wherein, the touch position optimizing computation processing of the original coordinate data, which is made by the master control single-chip microcomputer module, comprises the steps of:

(a) a pre-treatment: filtering the collected raw coordinate data by an improved Kalman filter;

(b) a smoothing process: processing the filtered coordinate data obtained by the step (a) with a continuous midpoint value algorithm; and (c) a filtering process: processing the coordinate data processed in accordance with the step (b) via a digital low-pass filter.

The computing formula used in the step (a) are as below: when $n \geq 2$, $$Y'_a(n) = 2Y_a(n-1) - Y_a(n-2) \qquad (A);$$

$$Y_a(n) = Y'_a(n) + Kg*(X(n) - Y'_a(n)) \qquad (B);$$

when $n=1$ or $n=0$, $Y_a(n) = Y'_a(n) = X(n)$;

wherein, $X(n)$ is the original coordinate values calculated on the basis of the raw data acquired by the self-checking capacitance sensing module from the capacitive touch pad at a current instance n; $Y'_a(n)$ is a pre-measured value of coordinate of the system at the current instance n; $Y_a(n)$ is a most optimization value of coordinate of the system at the current instance n, i.e., an output of the step (a); $Y_a(n-1)$ and $Y_a(n-2)$ are the most optimization values at the last instance and the instance before the last instance of the system, respectively; and Kg is the Kalman Gain.

The computing formula used in the step (b) is as below:

$$\text{when } n>1, Y_b(n)=(Y_a(n-2)+Y_a(n))/2;$$

$$\text{when } n=1 \text{ or } n=0, Y_b(n)=Y_a(n);$$

wherein, $Y_a(n-2)$, $Y_a(n-1)$ and $Y_a(n)$ are output values of the step (a) and will be the input values of the step (b); and $Y_b(n)$ is an output value of the step (b).

The computing formula used in the step (c) is as below:

$$\text{when } n\geq 1, Y_c(n)=aY_b(n)+(1-a)Y_c(n-1);$$

$$\text{when } n=0, Y_c(n)=Y_b(n);$$

wherein, $Y_b(n)$ is an output value of the step (b) and will be an input value of the step (c); $Y_c(n)$ is an output of the step (c); and a is a filter smoothing factor.

A cycle during which the self-checking capacitance sensing module acquires source data from the capacitive touch pad is that a number of sensing paths of the capacitive touch panel times 2 milliseconds; and a cycle of the master control single-chip microcomputer module acquiring source data from the self-checking capacitance sensing module is 20 milliseconds.

The value of the Kalman Gain in the step (a) is set to 0.5625.

The value of the filter smoothing factor in the step (c) is set to 0.375.

The present invention also provides a capacitive touch control device using the above processing method, comprising an 8-bit master control single-chip microcomputer module, the self-checking capacitance sensing module, the capacitive touch pad and a data transmission module; wherein said 8-bit master control single-chip microcomputer module controls the self-checking capacitance sensing module and obtains source data acquired by the self-checking capacitance sensing module from the capacitive touch pad, and then the source data are subjected to touch position computing and processing in order to obtain the coordinate of the touch point; and finally, the information corresponding to the coordinate is sent out by the data transmission module.

The present invention also provides a remote controller containing the above-described capacitive touch control device, comprising an 8-bit master control single-chip microcomputer module, the self-checking capacitance sensing module, the capacitive touch pad, a data transmission module, and a keyboard scanning module; said 8-bit master control single-chip microcomputer module first waits for an interrupt request sent from the self-checking capacitance sensing module or the keyboard scanning module; after receiving the interrupt request from the self-checking capacitance sensing module, said 8-bit master control single-chip microcomputer module controls the self-checking capacitance sensing module and obtains the source data acquired by the self-checking capacitance sensing module from the capacitive touch pad, and the source data are subjected to touch position computing in order to obtain the original coordinate data of the touch point which will be subject to optimizing computation processing to provide an optimization coordinate position; and finally, the information corresponding to the coordinate is sent out by the data transmission module; once the interrupt request has been processed, the 8-bit master control single-chip microcomputer module returns to the state of waiting for an interrupt request.

Compared to the prior art, the present invention has the following advantages:

1: Since the present invention adopts such a solution that the electronic devices of the low-end single-chip microcomputer are incorporated with the capacitive touch pad, it can fully take advantages of calculation and processing capabilities of the low-end single-chip microcomputer and thus can improve the data processing efficiency, thereby achieving the effects of the high capabilities and high resolution outputs of the capacitive touch pad on the low-end single-chip microcomputer.

2: The present invention uses an improved Kalman filter to process the raw coordinate data, and obtains an optimal value as an original value for a later processing by calculating the prior recorded coordinate data and the currently measured coordinate data. The calculation method of the improved Kalman filter is much simpler than the calculation method of the prior Kalman filter originally used in the high-capability single-chip microcomputer, so that the improved Kalman filter are suitable to be used on the platform of low-end single-chip microcomputer and can be easily applied to some low cost or low standard design platforms, while achieving a good filtering effect.

BRIEF DESCRIPTION OF THE DRAWINGS

FIG. 5 (b) is a display effect view of drawing the letter Z on the touch pad with a finger at an extremely low speed after using the midpoint value algorithm;

FIG. 5 (c) is a display effect view of drawing the letter Z on the touch pad with a finger at a low speed before using the midpoint value algorithm;

FIG. 5 (d) is a display effect view of drawing the letter Z on the touch pad with a finger at a low speed after using the midpoint value algorithm;

FIG. 6 (b) is a display effect view of drawing the letter Z on the touch pad with a finger at an extremely low speed after using the digital low-pass filter;

FIG. 6 (c) is a display effect view of drawing the letter Z on the touch pad with a finger at a low speed before using the digital low-pass filter;

FIG. 6 (d) is a display effect view of drawing the letter Z on the touch pad with a finger at a low speed after using the digital low-pass filter;

FIG. 10 (*b*) is a schematic coordinate diagram after pre-treating the seventeen sampling points shown in the FIG. 10 (*a*);

FIG. 10 (*c*) is a schematic coordinate diagram after smooth processing the seventeen sampling points shown in the FIG. 10 (*b*);

FIG. 10 (*d*) is a schematic coordinate diagram after filter processing the seventeen sampling points shown in the FIG. 10 (*c*).

DETAILED DESCRIPTION

Figure 1:
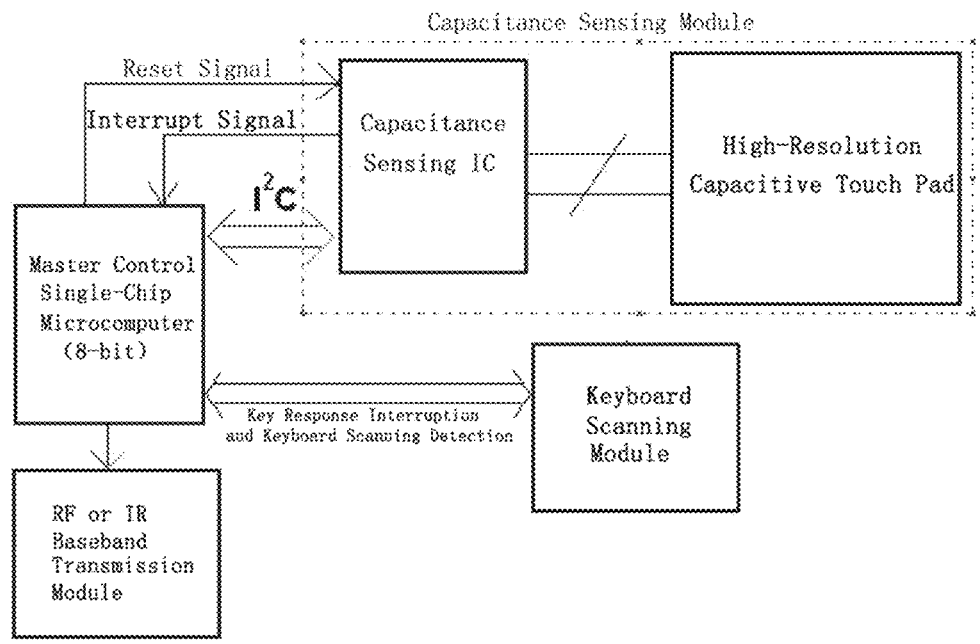
FIG. 1 is a schematic view illustrating interior modules of a remote controller having a capacitive touch controlling device according to the present invention.

Now, preferred embodiments of the present invention will be described in detail with reference to the accompanying drawings. In all the accompanying drawings, like reference numerals refer to the same or equivalent parts.

FIG. 1 illustrates the configuration of the interior modules of the remote controller using the capacitive touch control device according to the present invention, which mainly comprises the following module portions: a 8-bit master control single-chip microcomputer module, a self-checking capacitance sensing module (Sensor IC), a capacitive touch pad, a RF or IR baseband data transmission module, and a keyboard scanning module. The master control single-chip microcomputer module controls the self-checking capacitance sensing module and acquire raw data detected by the self-checking capacitance sensing module from the capacitive touch pad, then obtains the coordinates of a touch point by processing the raw data in a touch position calculation and optimization calculation; and finally, sends out the information corresponding to the coordinates through the data transmission module. Workflows of each module are as below:

(1) Resetting and self-initializing the master control single-chip microcomputer module;

(2) Sending a reset control signal by the master control single-chip microcomputer module to the self-checking capacitance sensing module via a reset input control interface which is trigged at a low power level; the request for reset can be accomplished either via the input control interface or software commands (which refer to the hardware reset commends sent from the master control single-chip microcomputer to the capacitance sensing module via a I²C communication interface);

(3) After the self-checking capacitance sensing module has been hardware reset, the master control single-chip microcomputer module sending out a function initialization command to the self-checking capacitance sensing module via the I²C interface in order to initialize the capacitance sensing module and set its working condition; and then the master control single-chip microcomputer module entering into a sleep mode and waiting for a interrupt request sent from the self-checking capacitance sensing module or the keyboard scanning module; and (4) The capacitance sensing IC outputting a 2 µs low level pulse interrupt signal via an interrupt output interface to the master control single-chip microcomputer module when the touch pad is touched; after receiving the interrupt signal, the master control single-chip microcomputer beginning to collect raw data from the self-checking capacitance sensing module; and then, computing the raw data by using the said processing method and sending the computation results via the data transmission module.

The period of the self-checking capacitance sensing module automatically collecting the data from the capacitive touch pad, i.e., the cycle of periodically collecting data on the capacitive touch pad, is the number of the sensing paths times 2 milliseconds. As long as the capacitance sensing module is in its operating condition, the self-checking capacitance sensing module will update the data with this constant cycle, no matter whether or not the master control single-chip microcomputer requests the data from the capacitance sensing module. The master control single-chip microcomputer requests the data from the capacitance sensing module at 20-millisecond intervals. These data is the raw data collected from the capacitive touch pad.

Figure 8:
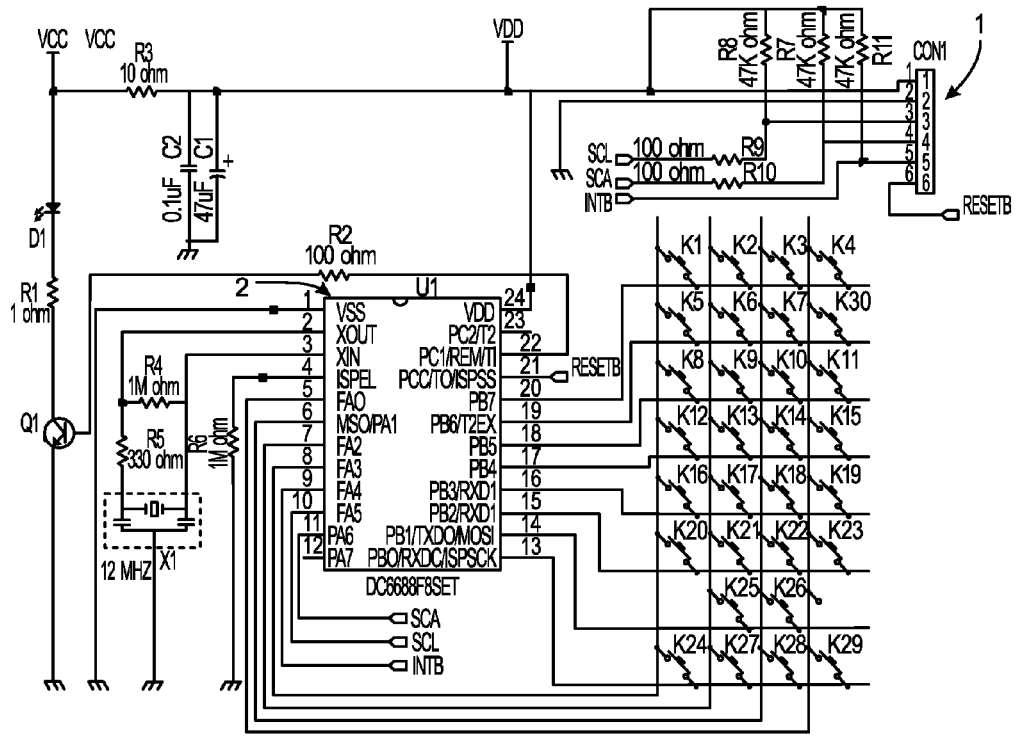
FIG. 8 is a circuit diagram of the master control single-chip microcomputer and physical keys.
Figure 9:
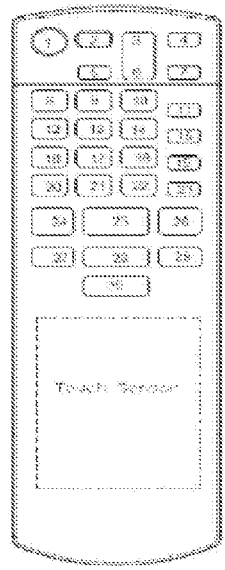
FIG. 9 is an appearance structural view of the remote controller having the capacitive touch control device shown in FIG. 1.
Figure 10A:
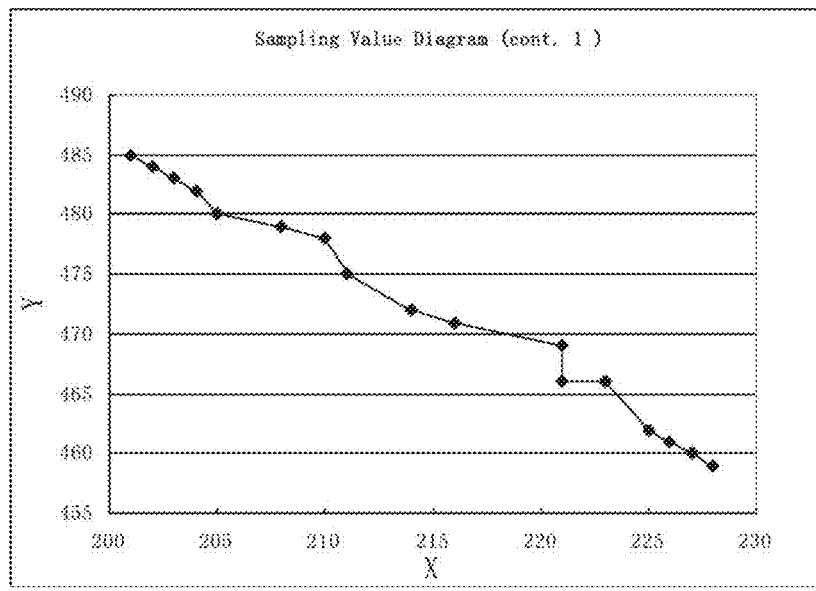
FIG. 10 (*a*) is a schematic coordinate diagram of the original data of seventeen sampling points.
Figure 10B:
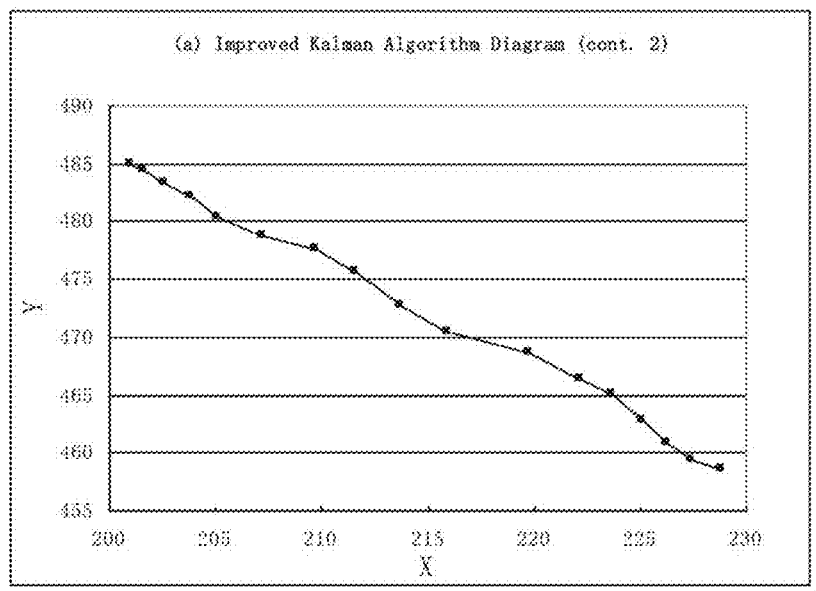
Figure 10C:
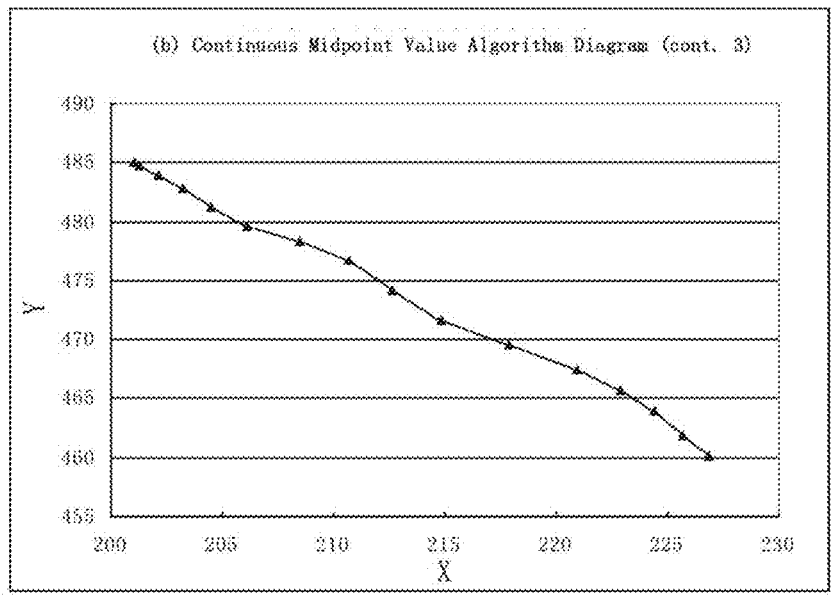
Figure 10D:
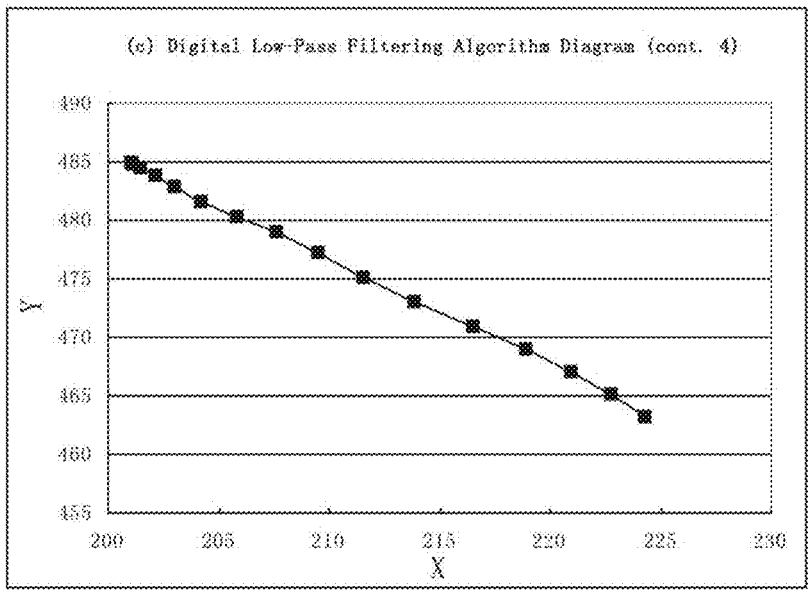

Because the self-checking capacitance sensing module and the keyboard scanning module are independent interrupt sources, respectively, a MCU can independently process the related interrupt request and respond to the corresponding secondary procedure, regardless of whether the self-checking capacitance sensing module or the keyboard scanning module is interrupted. After the event of processing the interruption is finished, the MCU returns to its sleep mode automatically. Naturally, because it is a single-mission system, the MCU cannot respond to the interrupt requests of the self-checking capacitance sensing module and of the keyboard scanning module simultaneously. Therefore, the MCU can only respond to the first-arrived interrupt request and can respond to the other or a new interrupt request only after exiting the current running interruption secondary procedure (i.e., when the MCU returns to its sleep mode again). The circuit diagrams of the master control single-chip microcomputer and the physical keys are shown in FIG. 8, in which the communication interface is indicated by the numeral 1; the master control single-chip microcomputer is indicated by the numeral 2. The appearance of the remote control device is schematically shown in FIG. 9.

The data transmission module is a shared module. It means that the capacitance sensing module and the keyboard scanning module use the same data transmission module when sending out information.

Wherein, the 8-bit master control single-chip microcomputer controls the whole running of the sensing chip, including initialization, detecting the data change of the capacitive input paths, computation of each level (including the main body algorithm of the present invention) and processing after inputting the data and data transmission, and other management functions, such as power consumption management, interrupt management, and the like.

Figure 7:
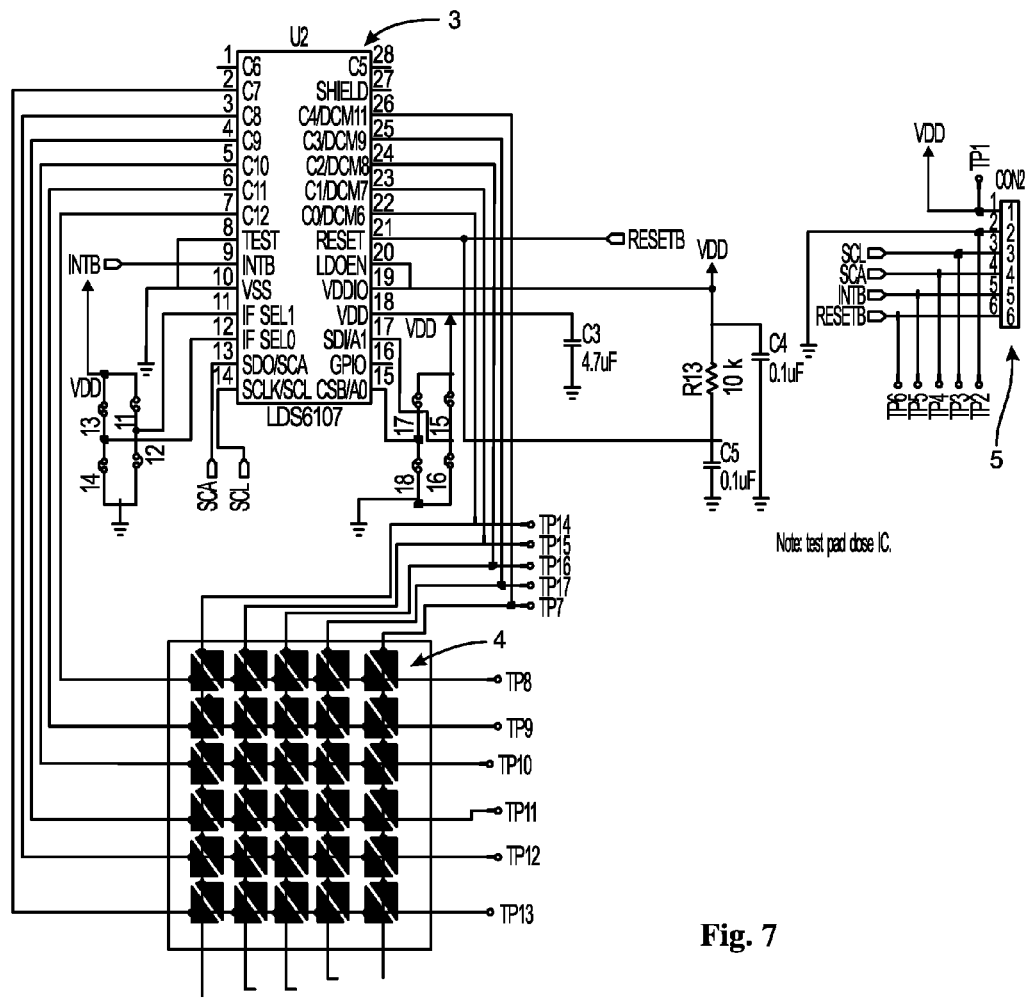
FIG. 7 is a circuit diagram of the self-checking capacitance sensing module.

The sensing chip (Sensor IC) is a multi-path capacitance sensing module. As shown in FIG. 7, a main IC of the self-checking capacitance sensing module is indicated by the numeral 3, which integrates an I²C interface (that is indicated by the numeral 5) and a SPI communication interface in order to facilitate the MCU in reading the capacitance value of each of the capacitance sensing paths. Each path on the Sensor IC should be connected to a small touch piece on the touch pad (which is indicated by the numeral 4 in the Figure) in order to detect the varied capacitance values. A plurality of small touch pieces are arranged into an orthogonal touch pad in a certain manner, as shown by the structural view of the capacitance sensing pad in FIG. 2. To ensure the flatness and linearity of the touch pad, FR4 sheets can be selected as the material of PCB by the appropriate selection of substrate materials. Of course, other materials can also be used.

The sensing chip used in this particular illustrative embodiment is LDS6100 that is the name of a series of chips and is designed and manufactured by IDT, Integrated Equipment Technology. In the design of the present invention, LDS6107 of this series of chips is used as a design detecting main component. But, advanced level of design and application effects is difficult to reach if this component is simply used. When applying the three algorithms of the present invention to the design of LDS 6107 Touch Pad, an excellent output improvement can be achieved, and effects equivalent to the high level design solution can also be obtained.

Figure 2:
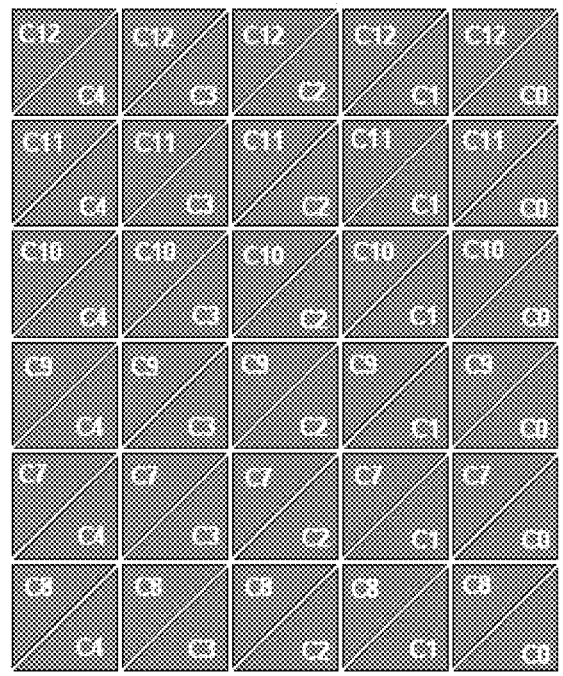
FIG. 2 is a schematic view illustrating a partial structure of the capacitive touch pad used by the present invention.

The design of capacitive touch pad sensing matrix of the present invention adopts a prior art, such as IDT technology. Based on this type of touch pads, and incorporating with an interpolation algorithm method, the coordinates of the position where the touch is taken place can be computed out, that is, the original coordinate data of the touch position can be obtained. As shown in FIG. 2, each small triangle shown in the drawing refers to a small touch piece; CO, C1, C2 . . . refer to a different path, respectively, wherein, there are six transverse paths (C8, C7, C9, CIO, C11 and C12), each of which has five small touch pieces arranged transversely and connected with each other; and there are five vertical paths (C4, C3, C2, C1 and CO), each of which has six small touch pieces arranged vertically and connected with each other.

As shown in FIG. 2, there are eleven sensing paths on the capacitive touch pad, each of which corresponds to an input interface (i.e., a sensing path) of the capacitance sensing chip (LDS6107). The capacitive touch pad is of a basic design formed of eleven input interfaces and is formed into a pattern of 5×6 input matrix, based on the specification of LDS6107 chips. Since the every two adjacent input paths have up to 200 pixels, an output result of a resolution of up to ((5−1)×200)×((6−1)×200)=800×1000 pixels can be obtained in light of the algorithms of the present invention. IDT only applies ×16 pixels to the adjacent input path, whereas the present invention, in a combination with the interpolation algorithm and the three algorithms, can set a high resolution of ×200 by utilizing the capacitive value detection capability of 0.025 pF per step, which is provided by the ends of input paths. It is one of the main characteristics of the present invention.

Figure 3:
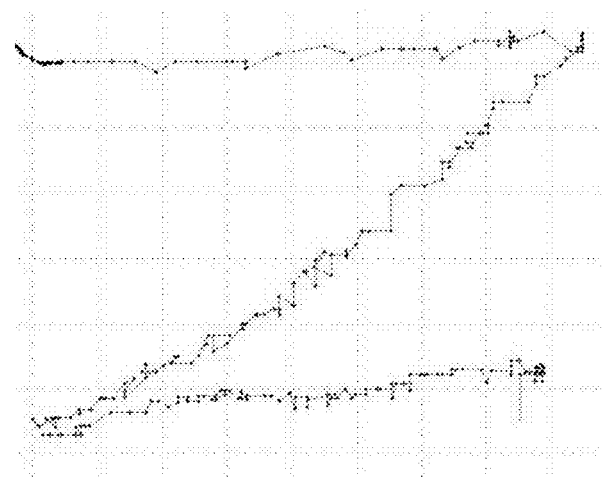
FIG. 3 is a display effect view of the original coordinates originated by a letter Z directly drawn on the capacitive touch pad shown in the FIG. 2 and calculated on the basis of the touch original data obtained by the self-checking capacitance sensing module of the touch pad.

The capacitive touch pad is not fully ideal since it may be affected by the external environment so that the capacitive values obtained by the Sensor IC have deviations, or even errors, which results in improper coordinate data computed out therefrom. FIG. 3 illustrates an effect view of a pattern displayed according to the positions of the touch points merely detected by the Sensor IC. This drawing is a report diagram of the position points derived from the action of drawing a letter Z on the touch pad. It is apparent that the output effect of the touch system is poor, and with the movement of the finger, the output points cannot synchronously output the values of the corresponding points. Still further, the values of the touch points directly measured by the touch pad are often inaccurate. For example, the results of multiple measurements to one touch point cannot indicate the same point, which are required to be indicated by an average value. In this manner, it cannot ensure the real-time capability of the touch system. According to the real-time capability desired by the system, it can avoid of the uncertainty and unreasonable output condition generated due to random disturbances.

Therefore, it is desired to incorporate suitable processing procedures to process the raw data detected by the Sensor IC in order to form a better display effect. The procedure of optimizing and computing process of the raw coordinate data by the master control single-chip microcomputer module in the capacitive touch control device according to this method will be described in detail hereafter:

(a) A pre-treatment step: adopting a data processing procedure of MCU in which an improved Kalman filter is utilized in the system.

The Kalman filter is an optimal recursive data processing algorithm, by which the optimal value of the current instance can be pre-determined on the basis of the estimated value of the current instance obtained based on the optimal value of the last instance and the measured value in the current condition, without needing to record, process and analysis many data in the prior conditions. Accordingly, Kalman filter not only can simplify the complexity of the system, but also can ensure the real-time capability of the system.

The essence of the Kalman filter is to predict and update the system. In the predictive stage, the filter produces estimation on the current condition by using the optimal value of the last condition. In the updating stage, the filter optimizes the estimated value obtained in the predictive stage by use of the measured value at the current condition in order to acquire a new optimal value that is more accurate.

Predictive Stage:

Predicting the current condition based on the last condition of the system:

$$X(k1k-1)=AX(k-1|k-1)+BU(k) \quad (1);$$

wherein, X(k1k−1) is the result obtained by the prediction on the last condition; X(k−1|k−1) is the optimal result of the last condition; U(k) is a control amount of the current condition.

The covariance of X(k−1|k−1) is expressed by P:

$$P(k1k-1)=AP(k-1|k-1)A'+Q \quad (2);$$

wherein, P(k1k−1) is a covariance corresponding to X(k1k−1); P(k−1l k−1) is a covariance corresponding to X(k−1|k−1); A' is the transposed matrix of A; Q is a covariance of the system process.

Updating Stage:

The optimal estimated value X(k1k) at the current condition (k) can be obtained over a combination of the predictive value and measured value:

$$X(k1k)=X(k1k-1)+Kg(k)(Z(k)-HX(k1k-1)) \quad (3);$$

wherein, Kg is the Kalman Gain:

$$Kg(k)=P(k1k-1)H'/(H\ P(k1k-1)H'+R) \quad (4);$$

Now, the optimal estimated value X(k1k) of the k condition is obtained. However, in order to continuously operate the Kalman filter until the system process is completed, it is required to update the covariance of X(k1k) in the K condition:

$$P(k1k)=(I-Kg(k)H)P(k1k-1) \quad (5);$$

wherein, I is the matrix of 1, and as to a single model and a single measurement, I=1. When the system is in the k+1 condition, P(k1k) is P(k−1|k−1) as expressed in formula (2). In this manner, the algorithm can be operated in an autoregressive manner.

So far, the five formulas of the Kalman filter have been described above. However, with the speed of the 8-bit single-chip having a main frequency of 12 MH, too many operating commands and too much time is required to implement the algorithms by completely following the five formulas. It is unrealistic to implement the above algorithms in a system of 8-bit MCU, based on the design of the present invention. To apply the Kalman filter algorithm into the system of 8-bit MCU, therefore, the five formulas of Kalman need to be simplified.

The output of the touch pad system according to the present invention is a series of coordinate points, and these points should have a certain continuity and predictability within a short period of time. Sudden crosstalk and point jumping shall be regarded as interference. Thus, the predication of the system can be implemented by a linear formula. Please see the formula (6):

$$\text{when } n>1, Y'_a(n)=2Y_a(n-1)-Y_a(n-2) \qquad (6);$$

$$\text{when } n=1 \text{ or } n=0, Y_a(n)=Y'_a(n)+Kg^*(X(n)-Y'_a(n)) \qquad (7);$$

X(n) is the original coordinate values calculated from the raw data acquired by the master control single-chip microcomputer module from the self-checking capacitance sensing module at a current instance n; $Y'_a(n)$ is the predicated coordinate values of the system at the current instance n; $Y_a(n)$ is the optimal value of coordinate of the system at the current instance n, i.e., an output of the step (a); $Y_a(n-1)$ and $Y_a(n-2)$ are the optimal values of the system respectively in the last instance and the instance before the last instance, which means that the predictive value of the instance n is determined by the optimal results of the n−1 and n−2 instance; and Kg is the Kalman Gain.

The Kalman Gain Kg is a coefficient varying with the system in a real-time manner. To simplify the Kalman filter algorithm, Kg is assumed to be a constant value, and then the optimal value at the current instance can be transformed from formula (3) to formula (7).

Since the value of the Kalman Gain is kept constant, the formula (2), (4) and (5) in the original Kalman algorithm are no longer needed. The magnitude of Kg determines whether the system is highly trusted in the predictive value or in the measured value.

Formula (6) and (7) involve in the application of the improved Kalman filter in the invention method (the improved Kalman filter hereinafter referred to as "mK filter").

Figure 4:
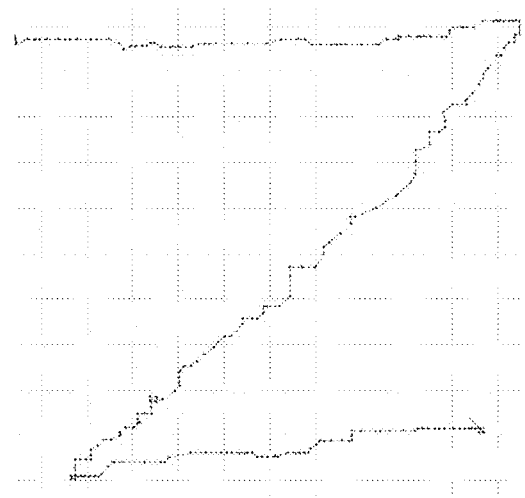
FIG. 4 is a display effect view after the process of using the improved Kalman filter to process the raw coordinate data in the data processing procedure of the method.
Figure 5A:
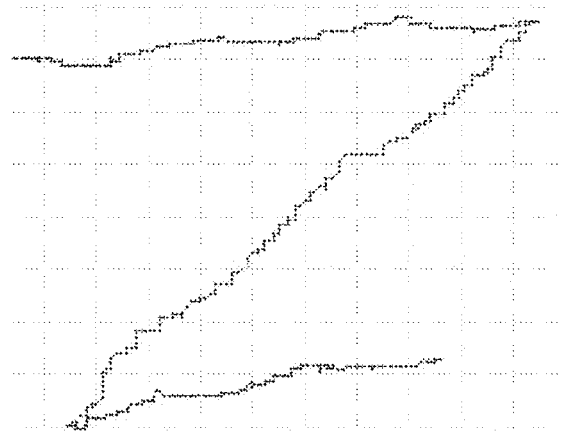
FIG. 5 (a) is a display effect view of drawing the letter Z on the touch pad with a finger at an extremely low speed before using the midpoint value algorithm.
Figure 5B:
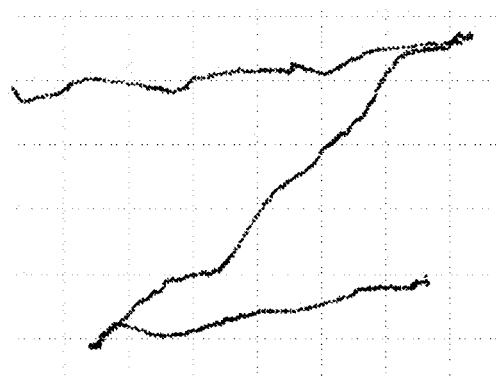
Figure 5C:
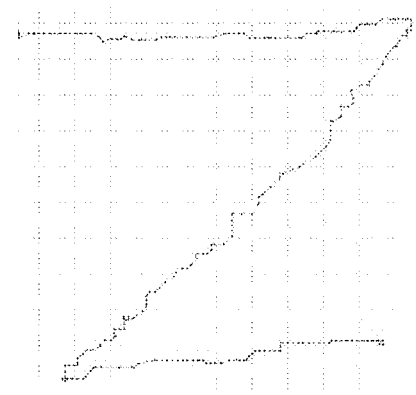
Figure 5D:
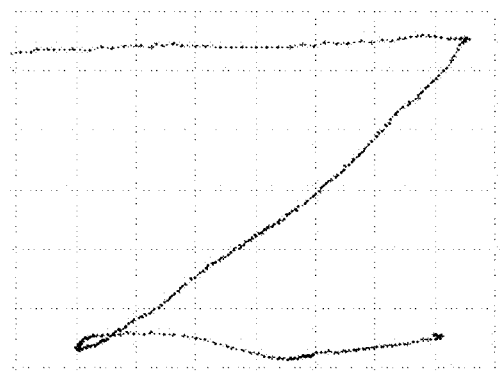
Figure 6A:
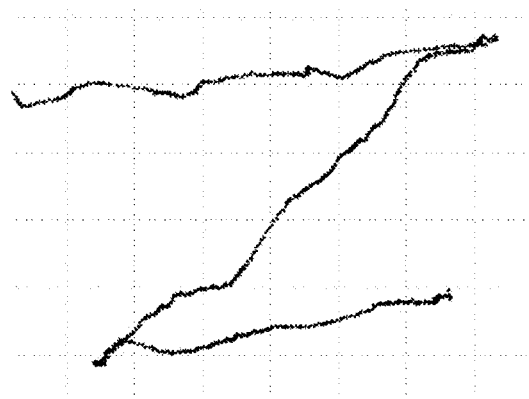
FIG. 6 (a) is a display effect view of drawing the letter Z on the touch pad with a finger at an extremely low speed before using the digital low-pass filter.
Figure 6B:
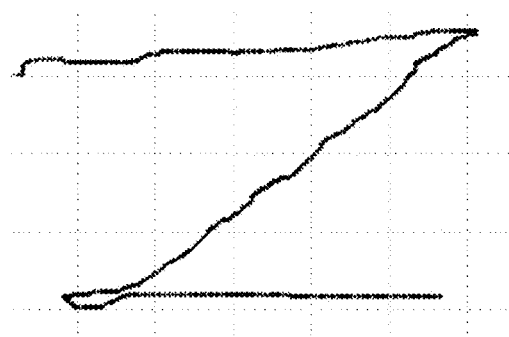
Figure 6C:
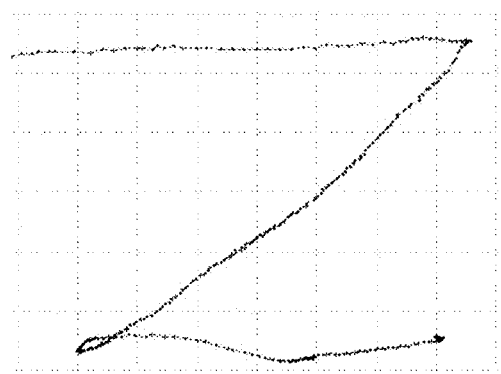
Figure 6D:
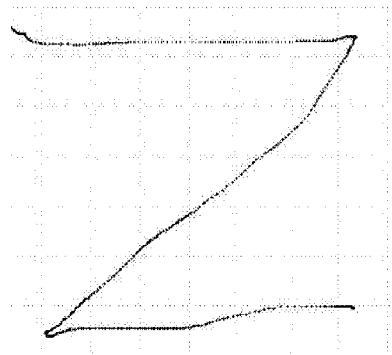

Kg is assumed to be an adjusted coefficient in a detection system. In the case of an original Kalman filter, a tremendous amount of resources will be used to compute this value. However, in the mK filter, Kg is set to a suitable constant value through an on-site debugging in order to express the level of trust in the system. Kg is a decimal value between 0 and 1, wherein a high Kg value represents a high credibility of the results of the system, and vice versa. In this exemplary embodiment, the value of Kg is set to 0.5625. With the use of the improved Kalman filter, the output effect of the system has been improved to some extent, and the follow-up of the output points becomes more reasonable. FIG. 4 is a display effect view after using the improved Kalman filter to process the raw coordinate data.

Because the operation of the original Kalman filter needs to use the five theoretical formulas to provide predictive and recursive adjusted results and obtain the optimal values, it becomes an obstacle of application by the low-cost system. According to the present invention, by appropriately altering to the original Kalman filter, the improved Kalman filter of the present invention has adjusted and pre-set the formulas so that five algorithms are reduced to two algorithms, thereby removing a large amount of floating-point calculations.

However, the result of filtering by the improved Kalman filter cannot idealize the operation of the touch pad since it cannot solve the problems regarding the output points even and continuity and jaggy effect. Therefore, it is desired to introduce the application of an output smoothing process.

(b) The smoothing process: smooth processing the data processed in the step (a) by a continuous midpoint value algorithm.

Median filtering and moving averaging algorithms are the algorithms often used in a data collection system. However, their common characteristic is a need for a large amount of data and a certain delay. Thus, they cannot be used in the present invention directly. Therefore, the invention method introduces a continuous midpoint value algorithm.

The continuous midpoint value algorithm can be used to smooth abrupt change and unexpected output points. Using continuous sampling outputs tends to be reasonable and smooth, does not need to occupy many single-chip microcomputer's resource, and can ensure the real-time capability of the outputs of the system in a certain procedure. The computing procedure is described as below:

$$\text{when } n>1, Y_b(n)=(Y_a(n-2)+Y_a(n))/2;$$

$$\text{when } n=1 \text{ or } n=0, Y_b(n)=Y_a(n);$$

wherein, $Y_a(n-2)$, $Y_a(n-1)$ and $Y_a(n)$ are output values of the step (a) and are input values of the step (b); and $Y_b(n)$ is an output value of the step (b).

The following description relates to a comparison of the touch pad system before and after the application of the continuous midpoint value algorithm:

FIGS. 5 (a) and 5 (b) illustrate a comparison of drawing a letter Z on the touch pad with a finger at an extremely low speed before and after using the midpoint value algorithm. As shown in FIG. 5 (a), before the usage of the midpoint value algorithm, the output points are non-continuous, and there are many repeated points, so that a phenomenon such as generating sawtooth-like waves has appeared when linking all the output points together.

As shown in FIG. 5 (b), by using the midpoint value algorithm, the continuity of the output points has been improved greatly. The link line of the output points substantially eliminates the phenomenon such as generating sawtooth-like waves and is relatively smooth.

FIGS. 5 (c) and 5 (d) illustrate a comparison of drawing a letter Z on the touch pad with a finger at a low speed before and after using the midpoint value algorithm.

As shown in FIG. 5 (c), before the usage of the midpoint value algorithm, the output points are non-continuous, and there are many repeated points, so that a phenomenon such as generating sawtooth-like waves has appeared when linking all the output points together.

As shown in FIG. 5 (d), by using the midpoint value algorithm, the continuity of the output points has been improved remarkably, and the distribution of the output points is relatively even. Still further, the link line of the output points substantially eliminates the phenomenon such as generating sawtooth-like waves and is relatively smooth.

Because the outputs of the touch points of the touch pad are approximately continuous and are changed very slowly, those high-frequency interferences (abrupt-changed phenomena still exist so that the effect of moving at an extremely low speed is still not smooth completely) has not been filtered completely. Therefore, the next step of implementing a digital low-pass filter processing is needed.

(c) The filter Processing Procedure:
Digital Low-Pass Filter

The outputs of the touch points of the touch pad are approximately continuous and are changed very slowly. As such, high-frequency oscillation and the abrupt change of outputs can be deemed as interference. A digital low-pass filter imitates a hardware low-pass filtering function by adopting software algorithms in order to filter out the interference caused by the slowly changed signals.

A first-order differential equation for a RC low-pass filter is:

$$U_i = iR + \mu_0 = RC\, du_0/dt + \mu_0 = \tau\, du/dt = \mu_0;$$

wherein, $\tau = RC$ is a time constant of the circuit. When X is replaced with ui and Y is replaced with uo, the differential equation is transformed into a difference equation, which is:

$$X(n) = \tau(Y(n) - Y(n-1))/\Delta t + Y(n);$$

After reorganizing the above equation, we can reach:

$$Y(n) = \Delta t/(\tau + \Delta t)X(n) + \tau/(\tau + \Delta t)y(n-1)$$

wherein, $\Delta t$: sampling period; $X(n)$: the collecting value at this time; $Y(n)$ and $Y(n-1)$: an output values of the filter at this time and the last time. If $\alpha = \Delta t/(\tau + \Delta t)$, the above equation can be transformed into:

$$\text{when } n \geq 1, Y_c(n) = \alpha Y_b(n) + (1-\alpha)Y_c(n-1);$$

$$\text{When } n = 0, Y_c(n) = Y_b(n);$$

wherein, $Y_b(n)$ is an output value of the step (b) and an input value of the step (c); $Y_c(n)$ is an output of the step (c); and $\alpha$ is a filter smoothing factor.

In this manner, the algorithms of the low-pass filter can be easily implemented on an 8-bit single-chip microcomputer.

Hereinafter, it is described a comparison of a touch pad system before and after the application of a digital low-pass filter.

FIGS. 6 (a) and 6 (b) illustrate a comparison of drawing a letter Z on the touch pad with a finger at an extremely low speed before and after using the digital low-pass filter.

As shown in FIG. 6 (a), prior to using the digital low-pass filter, the effect is that there still have a few oscillations and jumps.

As shown in FIG. 6 (b), by using the digital low-pass filter, the oscillations and jumps are significantly reduced.

FIGS. 6 (c) and 6 (d) illustrate a comparison of drawing a letter Z on the touch pad with a finger at a low speed before and after using the digital low-pass filter.

As shown in FIG. 6 (c), prior to using the digital low-pass filter, the effect is that there still have a few jumps.

As shown in FIG. 6 (d), by using the digital low-pass filter, the jumping phenomenon is sustainability eliminated, and the resulting effect is smooth.

Table 1 below illustrates the computing data of seventeen sampling coordinate points obtained by implementing the above-described computing procedure:

TABLE 1

| | n | | | | | | | | | | | |
|---|---|---|---|---|---|---|---|---|---|---|---|---|
| | 0 | | 1 | | 2 | | 3 | | 4 | | 5 | |
| X, Y coordinates | X0 | Y0 | X1 | Y1 | X2 | Y2 | X3 | Y3 | X4 | Y4 | X5 | Y5 |
| Sampling values | 201 | 485 | 201 | 485 | 202 | 484 | 203 | 483 | 204 | 482 | 205 | 480 |
| (a) Improved Kalman algorithm | 201 | 485 | 201 | 485 | 201 | 485 | 202 | 484 | 204 | 482 | 205 | 481 |
| | 201 | 485 | 201 | 485 | 201 | 484 | 203 | 483 | 204 | 482 | 205 | 480 |
| (b) Continuous midpoint value algorithm | 201 | 485 | 201 | 485 | 201 | 485 | 201 | 485 | 202 | 484 | 203 | 483 |
| (c) Digital low-pass filtering algorithm | 201 | 485 | 201 | 485 | 201 | 485 | 201 | 485 | 201 | 485 | 202 | 484 |

| 6 | | 7 | | 8 | | 9 | | 10 | | 11 | | 12 | |
|---|---|---|---|---|---|---|---|---|---|---|---|---|---|
| X6 | Y6 | X7 | Y7 | X8 | Y8 | X9 | Y9 | X10 | Y10 | X11 | Y11 | X12 | Y12 |
| 208 | 479 | 210 | 478 | 211 | 475 | 214 | 472 | 216 | 471 | 221 | 469 | 221 | 466 |
| 206 | 479 | 209 | 477 | 212 | 477 | 213 | 474 | 216 | 470 | 218 | 468 | 224 | 467 |
| 207 | 479 | 210 | 478 | 212 | 476 | 214 | 473 | 216 | 470 | 220 | 469 | 222 | 466 |
| 204 | 481 | 206 | 480 | 208 | 478 | 211 | 477 | 213 | 474 | 215 | 472 | 218 | 470 |
| 203 | 483 | 204 | 482 | 206 | 480 | 208 | 479 | 209 | 477 | 211 | 475 | 214 | 473 |

| 13 | | 14 | | 15 | | 16 | | 17 | |
|---|---|---|---|---|---|---|---|---|---|
| X13 | Y13 | X14 | Y14 | X15 | Y15 | X16 | Y16 | X17 | Y17 |
| 223 | 466 | 225 | 462 | 226 | 461 | 227 | 460 | 228 | 459 |
| 224 | 464 | 225 | 464 | 227 | 461 | 228 | 459 | 230 | 458 |
| 224 | 465 | 225 | 463 | 226 | 461 | 227 | 459 | 229 | 459 |
| 221 | 468 | 223 | 466 | 224 | 464 | 226 | 462 | 227 | 460 |
| 217 | 471 | 219 | 469 | 221 | 467 | 223 | 465 | 224 | 463 |

FIG. 10 (a) is a schematic view of the coordinates of the above-described seventeen sampling points. The seventeen sampling points are subject to computation process in the three steps of the present invention, respectively, and the coordinate results obtained from the respective computation processes are shown in FIGS. 10 (b), (c) and (d). It will be appreciated that the original coordinates shown in FIG. 10 (a) are not very smooth, but, after processing through the three steps of the present invention, the coordinates shown in FIG. 10 (d) has become quite smooth.

Therefore, in the LDS6107 self-checking capacitance sensing design, in cooperation with a simple 8-bit single-chip microcomputer DC6688-12 MHz and working with the three algorithms, such as the improved Kalmen filter, an economic design approach of the remote controller can be obtained, which can be used on an actual product and corresponds to a medium and high-grade products. Its output performance extend from 192×96 pixels as published in the previous IDT to a high resolution of 1000×800 pixels, which is almost near to a high grade product.

The particular embodiment provides a particular embodiment of the remote controller of a capacitive touch control device. Of course, the method of the present invention can be applied to the remote control devices without the physical keys and keyboard scanning module so that a direct touch control scheme such as a mouse controller or a sliding control switch can be implemented. Therefore, it will be appreciated that the embodiments of the present invention cannot be limited to those discussed above. It will be understood that the embodiments described herein are merely exemplary and that a person skilled in the art may make many variations, substitutions and modifications in light of common technical knowledge in the art and the customary technical means, without departing from the spirit and scope of the disclosed subject matter. All such variations, substitutions and modifications are intended to be included within the scope of the claims.

What is claimed is:

1. A controlling device having a processing method for implementation of capacitive touch pad high resolution output, comprising:
a master control single-chip microcomputer module;
a keypad scanning module;
a self-checking capacitance sensing module;
a keypad;
a data transmission module; and
a capacitive touch pad;
wherein the self-checking capacitance sensing module and the keypad scanning module are independent interrupt sources for the master control single-chip microcomputer module, wherein the self-checking capacitance sensing module and the keypad scanning module both use the data transmission module to communicate data to the master control single-chip microcomputer module, wherein the master control single-chip microcomputer module receives source data acquired by the self-checking capacitance sensing module from the capacitive touch pad via the data transmission module, wherein the master control single-chip microcomputer module receives keypad data acquired by the keypad scanning module from the keypad via the data transmission module, wherein the keypad data is utilized by the master control single-chip microcomputer to cause a transmission of a command to an intended target appliance, the source data are subjected to touch position computing by the master control single-chip microcomputer to obtain an original coordinate of a touch point, wherein a coordinate position is obtained through an optimizing computation processing, and wherein the touch position optimizing computation processing of the original coordinate, which is made by the master control single-chip microcomputer module, comprises the steps of:
(a) a pre-treatment: filtering the collected raw coordinate data by an improved Kalman filter;
(b) a smoothing process: processing the filtered coordinate data obtained by the step (a) with a continuous midpoint value algorithm; and
(c) a filtering process: processing the coordinate data processed in accordance with the step (b) via a digital low-pass filter.

2. The controlling device as claimed in claim 1, wherein the computing formula used in step (a) comprises:
when n≥2, $$Y'_a(n)=2Y_a(n-1)-Y_a(n-2);$$

$$Y_a(n)=Y'_a(n)+Kg*(X(n)-Y'_a(n));$$

when n=1 or n=0, $Y_a(n)=Y'_a(n)=X(n)$;
wherein, X(n) is the original coordinate values calculated on the basis of the raw data acquired by the self-checking capacitance sensing module from the capacitive touch pad at a current moment n; $Y'_a(n)$ is a pre-measured value of coordinate of the system at the current moment n; $Y_a(n)$ is a most optimization value of coordinate of the system at the current moment n, i.e., an output of the step (a); $Y_a(n-1)$ and $Y_a(n-2)$ are the most optimization values at the last instance and the instance before the last instance of the system, respectively; and Kg is the Kalman Gain.

3. The controlling device as claimed in claim 1, wherein the computing formula used in step (b) comprises:
when n>1, $$Y_b(n)=(Y_a(n-2)+Y_a(n))/2;$$

when n=1 or n=0, $$Y_b(n)=Y_a(n);$$

wherein, $Y_a(n-2)$, $Y_a(n-1)$ and $Y_a(n)$ are output values of the step (a) and will be the input values of the step (b); and $Y_b(n)$ is an output value of the step (b).

4. The controlling device as claimed in claim 1, wherein the computing formula used in step (c) comprises:
when n≥1, $$Y_c(n)=\alpha Y_b(n)+(1-a)Y_c(n-1);$$

when n=0, $$Y_c(n)=Y_b(n);$$

wherein, $Y_b(n)$ is an output value of the step (b) and an input value of the step (c); $Y_c(n)$ is an output of the step (c); and α is a filter smoothing factor.

5. The controlling device as claimed in claim 1, wherein a cycle during which the self-checking capacitance sensing module acquires source data from the capacitive touch pad is a number of sensing paths of the capacitive touch panel times 2 milliseconds and a cycle of the master control single-chip microcomputer module acquiring source data from the self-checking capacitance sensing module is 20 milliseconds.

6. The controlling device as claimed in claim 1, wherein the value of the Kalman Gain in step (a) is set to 0.5625.

7. The controlling device as claimed in claim 1, wherein the value of the filter smoothing factor in step (c) is set to 0.375.

* * * * *